UNITED STATES PATENT OFFICE.

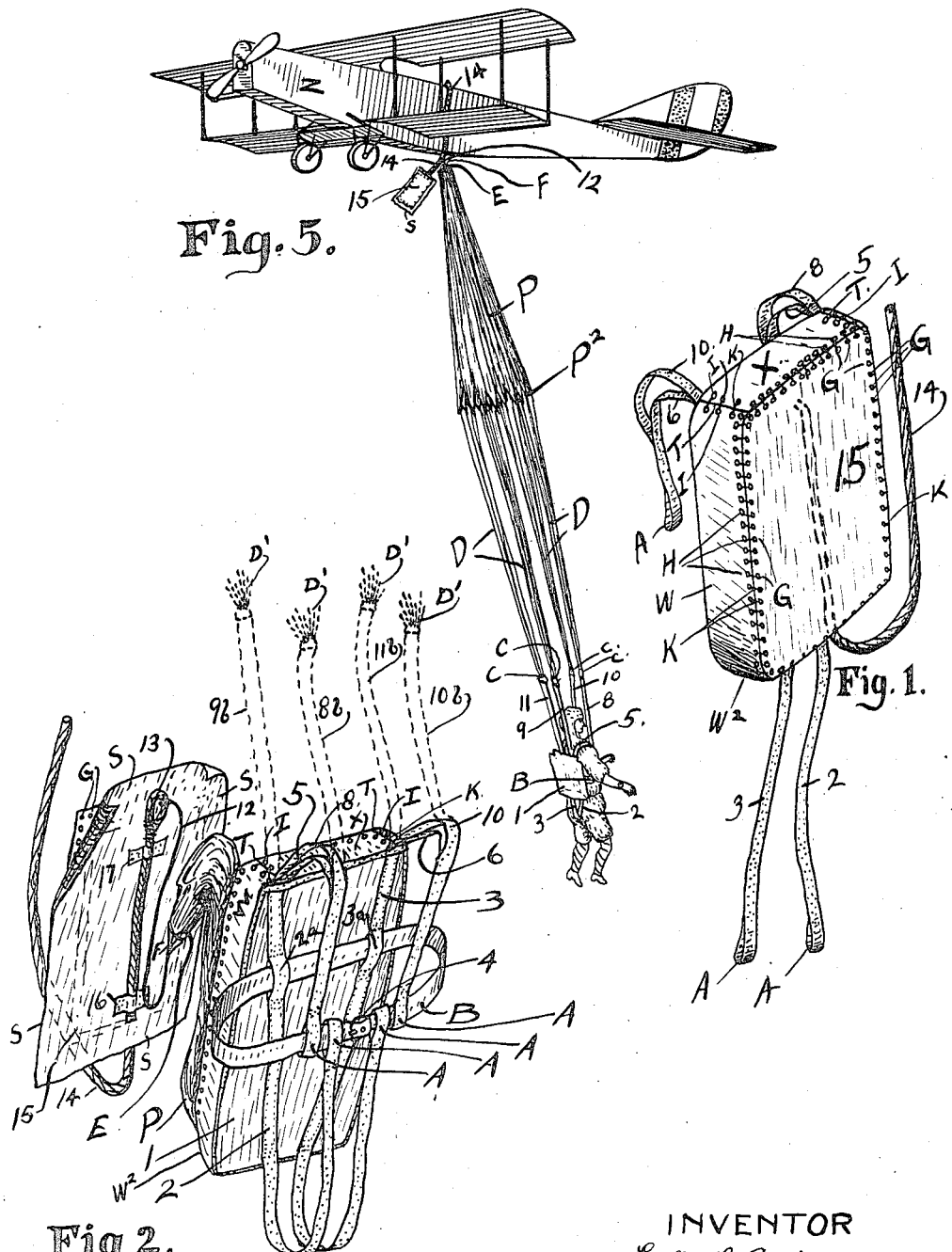

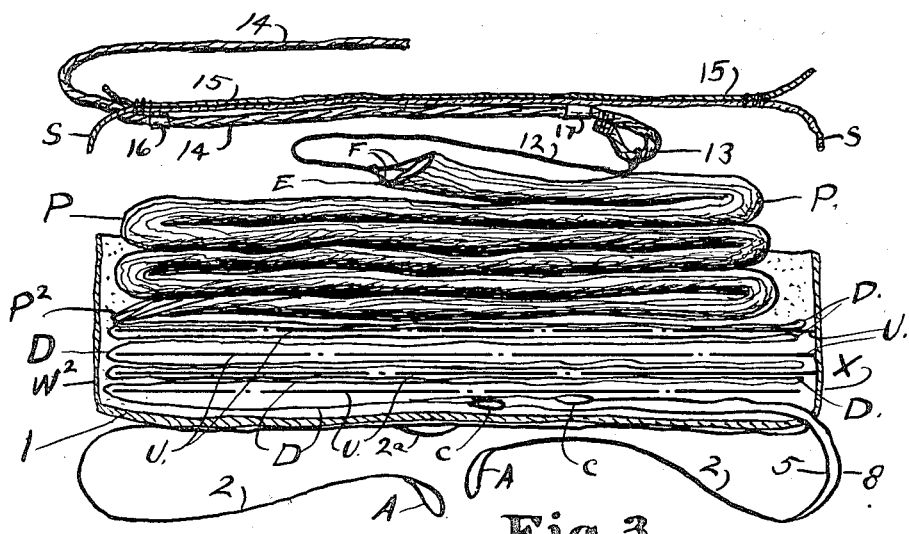
Fig. 3.
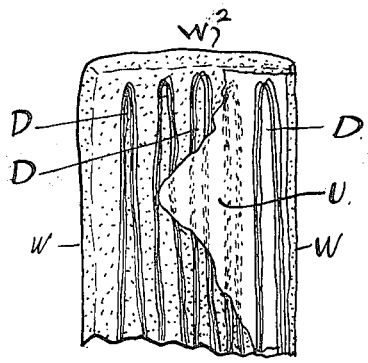
Fig. 4.
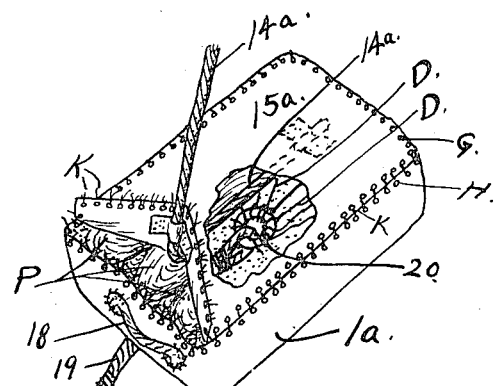
Fig. 6.
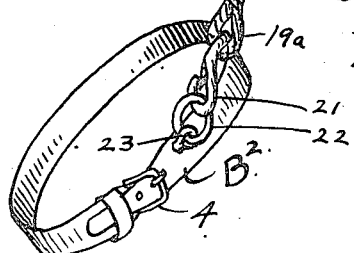

LESLIE L. IRVIN, OF KENMORE, NEW YORK.

SAFETY PARACHUTE-PACK.

1,323,983.  Specification of Letters Patent.  Patented Dec. 2, 1919.

Application filed December 16, 1918. Serial No. 267,065.

*To all whom it may concern:*

Be it known that I, LESLIE L. IRVIN, a citizen of the United States, residing at Kenmore, in the county of Erie and State of New York, have invented certain new and useful Improvements in Safety Parachute-Packs; and I do hereby declare the following to be a full, clear, and exact description of the same, such as will enable others skilled in the art to which it appertains to make and use the same, reference being had to the accompanying drawings, and to figures of reference marked thereon, which form part of this specification.

Like figures of reference refer to like parts.

This invention relates to safety parachute packs, particularly to that kind which includes the systematically packed parachute and connections in a neat sack.

One of the objects of my invention is to provide a dependable life preserver for an aviator, which, in addition to serving as a parachute, will be automatically releasable at the proper place and instant desired to insure the safe launching of the aviator from his abandoned airship, without entanglement with itself or by collision with the air craft.

Another object is to provide a safety parachute pack, including a parachute with attaching means to be used at will or to be fixed upon the body of the aviator, by way of a harness, to support the pack upon his back, at the same time having his body attached to the parachute within the pack, providing a device for ready and instant automatic use, when he jumps away from his machine.

A further object is to provide a means and a method of packing and handling a parachute, which will keep the large peripheral edge of the parachute gathered together and concealed from air currents until the parachute has become fully extended by being pulled by the top attachment to the air-ship during the descent of the aviator, to insure the full opening of the parachute at a safe distance from the air-ship, thus avoiding entanglement therewith. Accidents have been known to be caused by the premature opening of a parachute next to the air craft in a manner to prevent the proper functioning of the parachute bag.

An additional object of my invention is to means which will permit of packing the parachute in a manner to have the said means pulled away from the parachute having its top attached to the air-ship, on account of the fixing of the sack of the pack upon the body of the falling aviator.

A further object is to provide a simple parachute pack of light and strong construction which shall be automatically openable by the fall of the aviator from the airship.

Another object of this invention is to provide a method of folding the suspension cords of the parachute, and at the same time keep the various folds of these cords separated to facilitate their natural unfolding without entanglement, as they leave the containing case.

With these and other objects, my invention resides in certain construction of pack and its contents, beside the method of packing the same for the use of the aviators as a life preserver, all of which is illustrated in the drawings, is hereinafter described, the method of packing is explained, together with its use and what I claim is set forth.

In the drawings,

Figure 1 is a perspective view of a safety pack, embodying my invention.

Fig 2 is a perspective view of a like pack to the one shown in Fig. 1, but here shown having the cover removed and spaced from the body of the pack, illustrating the attachment thereto of the parachute, and the body harness which is in use fixed to the aviator as shown in Fig. 5.

Fig. 3 is a sectional side elevation of a loosely packed sack and contents, showing the manner of folding the parachute, its connection with the cover of the sack and the manner of packing the suspension cords of the parachute.

Fig. 4 is a fragmental plan, showing part of the suspension cords and a separator.

Fig. 5 is a perspective view of an aeroplane with aviator in the act of descending and breaking away from the air craft, while attached to the parachute in its extended position, which it takes automatically as the aviator falls away from the machine.

Fig. 6 is a modified form of pack partly opened, shown in perspective view; a form of pack particularly designed for the use of the aviator's mechanic or observer, to be attached at the time this assistant desires to leave the air-ship.

Referring to the construction illustrated in Figs. 1 to 5 inclusive, particularly to Fig. 2, there is shown sewed to the canvas bag 1, two canvas straps 2 and 3, each extending beyond the bag in both directions and terminating in loops A, A, A, A, through which passes the breast belt B, having a buckle 4, which when in place on the aviator, rests against his chest, while the bag 1 is at his back. The lower parts of the straps 2 and 3 pass between the aviator's legs, while the upper parts of these straps 2 and 3 pass tightly over his shoulders. The shoulder portions 5 and 6 have pairs of extensions 8 and 9, and 10 and 11 respectively, which terminate in metal rings C, C, C, C, to which are attached the suspension cords D, D, D, D, of the parachute P. The upper open ring E of the parachute P has several short cords F, F, F attached to a single light rope 12, which in turn is tied to the looped end 13 of the strong rope 14. The rope 14 is firmly attached to the cover 15 of the bag 1 by means of the bands 16 and 17. The cover 15 has a series of eyelets G, G, G, near its edges and also has a skirting piece S, which is tucked into the bag 1 over its contents, the side walls W, W, and end wall W² of the bag 1, have eyelets H, H, H which are jointed to the eyelets G, G, G, by a light and breakable cord K, when the bag 1 is closed. The side and end walls W, W, W² of the bag 1, are made continuous, while the top wall X is seperable from the walls W, W, at the slits T, T, the lips of which are provided with eyelets I, I, and are laced together with a light breakable cord K'. The strap extensions 8, 9, 10 and 11 pass through openings at the base of slits T, T, in pairs, as they enter the bag 1 in connection with the packed parachute P, and its cords D, D, D.

Referring to the manner in which the parachute and attachments are packed in the bag 1, as shown in Fig. 3, wherein the cover 15 is shown removed and spaced from the bag 1, the parachute P is systematically fluted and plaited together and is preferably made of a strong light silk cloth, with strong silk suspension cords D, D, D, D. The strap extensions 8, 9, 10 and 11, with their rings C, C, C, are carefully laid inside the bag 1, against the same, and the cords D, D, are laid straight on the bottom of the bag 1. A layer of thin paper U, is next laid over the portion of the cords D, D, and the strap extension pairs 8 and 9, and 10 and 11, are passed through the bases of the respective slits T, T, and laid straight with their rings C, C, C, C, upon the bottom of the sack 1 in the direction of its length, having the end portions of the cords D, D, D, D, pulled straight over the end wall W². A sheet of thin paper U, is next laid flat upon the bottom of the sack 1, covering the rings C, C, C, C, the strap extensions 8, 9, 10 and 11, and the ends of the cords D, D, D, D. The cords D, D, D, D, are next drawn back over the first paper layer U and carefully looped as shown in Fig. 4 and laid straight back to the paper edge next the end wall W, when another layer U of this paper is laid on top the first layer covering cord loops, after which other succcessive layers of cord loops and paper separators U, U, are laid on, having the cords turn over the edges of the paper separators, which adjoin the end wall W², until the peripheral edge of the parachute P is reached, when the parachute, which has been previously plaited and gathered together in a long longitudinal fold, is laid back and forth upon itself as shown in Fig. 4, until the ring E is reached when the cord 12, firmly attached to the rope loop 13, is laid as shown in the Fig. 4, after which the cover 15 is placed on and pressed down, having the skirt edge S, S, S, S, tucked between the top of the walls X, W, W, W², and the parachute P and the eyelets H and G are laced together with an easily breakable cord K. The lips of the slots T, T, are also laced together with a like cord K and the completed pack presents the appearance shown in Fig. 1. The pack, in this condition, is next placed upon the back of the aviator with the harness in place about his shoulders and between his legs as shown in Figs. 2 and 5.

In operation, upon entering the air-ship the aviator fixes the rope 14 to some part thereof near where he sits when operating his machine. When he wants to jump out, he does so and the rope 14, by its attachment to the cover 15, rips the cover off at the cords or threads which hold it in place by the eyelets G and H and when the cover is ripped clear of the sack 1, the continued descent causes the parachute P to be pulled out of the sack 1 by its ring E, attached by the light rope 12, and the cords F, to the strong rope 14. As the aviator continues to drop the sack 1, attached to him, is pulled away from the parachute which unfolds naturally and finally the cords D, D, D, D, are drawn out and the rings C, C, C, C, come next to be followed by the strap extensions 8, 9, 10 and 11, when the aviator for an instant reaches the position shown in Fig. 5. The next instant the light rope 12 breaks and he, with the parachute P drops free of the air-ship, leaving the cover 15 and the rope 14 still clinging to the air-ship Z. The parachute P immediately opens and he descends slowly to earth. In Fig. 2 the relative positions of the strap extensions 8, 9, 10 and 11 with the cords D, D, D, D, is shown dotted at $8^b$, $9^b$, $10^b$ and $11^b$ and D', D', D', D' respectively.

In the case of the sack $1^a$, shown in Fig. 6, the aviator's assistant wears a belt $B^2$ strapped about his chest at all times. This belt has an eye 23 through which is a ring 21. When the assistant wants to leave the air-ship in the air he grabs the bag or sack $1^a$ by the handle 18 and holds it near his chest while he snaps the hook 21 upon the ring 22. He then jumps out and with the rope $14^a$ previously attached to the air-ship the cover $15^a$ will become ripped off in the manner illustrated in Fig. 6 and the parachute with its suspension cords, leaves the bag $1^a$ in the same manner as that described for the form shown in the other figures; the folding and packing being done in the same way.

There is one difference in the construction wherein all the cords D are fixed to a single ring 20 which is attached to the bottom of the bag $1^a$ and to the short rope 19 having a looped end $19^a$ engaging a snap hook 21.

It makes no difference as to whether the aviator jumps out and falls head first or leaves in an upright position, as I have found by personal experience with my invention, the cover 15 or $15^a$ is ripped off in the manner above described, and the withdrawal and unfolding of the parachute is accomplished in a manner to have the peripheral edge $P^2$ remain within the bag 1 until the aviator has fallen the folded length of the body of the parachute to the point marked $P^2$ in Fig. 5, which is the peripheral edge of the parachute P. The advantage of bringing the peripheral edge $P^2$ of the parachute P to such a distance before the air is allowed to catch and open this parachute body avoids contact with any part of the air-ship during the drop and lends materially to safety.

The pack, as worn by the aviator, serves as a cushion to his back as he sits within his machine.

Having described my invention I claim:

1. In a parachute pack device adapted for use in connection with an airship, a parachute container, a cover releasably attached to said container, means connecting said cover with said airship, a parachute adapted to be packed within said container, means attaching said parachute at its top to said cover, a harness fixed to said parachute and fixed to said container, said harness being adapted to be attached to the body of an aviator, whereby upon the descent of said aviator, said container is pulled away from said cover and said parachute, by its attachment with said cover and means attached to said airship is pulled top first out of said container, the attachment of said parachute with said cover being breakable by the descending weight of said aviator to release said parachute to travel with said aviator.

2. In a parachute pack for use on an airship, a sack having a broad side cover thereon, being releasably attached thereto, a strong rope connecting said cover with said airship, a parachute folded within said sack and adapted to be pulled out top first and releasably attached to said cover, a harness attachable to the body of an aviator, said harness being fixed to said pack, having attachment with the suspension cords of said parachute.

3. In a parachute pack device, a parachute container, a releasable closure to said container, means for releasing said closure, a parachute adapted to be packed within said container, a harness fixed to said parachute, adapted to be attached to the body of an aviator, and other means attached to the top of said parachute for pulling the same, top first, out of said container upon the release of said closure by said first mentioned means.

4. In a parachute pack device, a parachute container, a releasable closure to said container, means for releasing said closure, a parachute adapted to be packed within said container, a harness fixed to said parachute and adapted to be attached to the body of an aviator, a suspension element fixed to said harness and to said parachute and positioned to the rear of said aviator, another suspension element fixed to said harness and to said parachute and positioned to the front of said aviator, and other means attached to the top of said parachute for pulling the same, top first, out of said container upon the release of said closure by said first mentioned means.

5. The method of systematically packing a parachute within a container having a harness attached to said parachute, of laying the suspension cords of said parachute into the container first, in lines, having separators between overlying portions of said cords, of subsequently folding said parachute in upon itself having its top placed within the container last, so as to come out first when said parachute is withdrawn from said container, and of releasably closing said parachute within said container.

6. In a parachute pack device, a sack, means for securing said sack to the body of an aviator, a parachute having suspension cords attached to said means, a cover removably attached to said sack and adapted to hold said parachute in folded and compressed condition within said sack when attached thereto, the top of said parachute being removably attached to said cover, and other means for fixing said cover to an aircraft to be used by the aviator, whereby, when said air-craft is in flight, the aviator may jump from the same causing said cover by its attachment to said air-craft to rip off from said sack attached to said aviator and pull said parachute out from said sack during the descent of the aviator, later causing the breaking away of the parachute from said cover, launching the aviator with the parachute.

7. The method of systematically packing a parachute with a container having a harness attached to said parachute, of laying the suspension cords of said parachute into the container first and subsequently folding said parachute in upon itself having its top placed within the container last so as to come out first when said parachute is withdrawn from said container, and of releasably closing said parachute within said container.

LESLIE L. IRVIN.